United States Patent
Felton et al.

(10) Patent No.: US 8,516,487 B2
(45) Date of Patent: Aug. 20, 2013

(54) DYNAMIC JOB RELOCATION IN A HIGH PERFORMANCE COMPUTING SYSTEM

(75) Inventors: Mitchell Dennis Felton, Rochester, MN (US); Ray LeRoy Lucas, Rochester, MN (US); Karl Michael Solie, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 482 days.

(21) Appl. No.: 12/703,922

(22) Filed: Feb. 11, 2010

(65) Prior Publication Data
US 2011/0197196 A1    Aug. 11, 2011

(51) Int. Cl.
G06F 9/46 (2006.01)
(52) U.S. Cl.
USPC ............ 718/104; 718/102; 718/103
(58) Field of Classification Search
None
See application file for complete search history.

(56) References Cited

U.S. PATENT DOCUMENTS

| | | | |
|---|---|---|---|
| 2004/0103218 A1* | 5/2004 | Blumrich et al. | 709/249 |
| 2008/0294872 A1 | 11/2008 | Bryant et al. | |
| 2009/0158276 A1* | 6/2009 | Barsness et al. | 718/100 |

* cited by examiner

*Primary Examiner* — Emerson Puente
*Assistant Examiner* — Sisley Kim
(74) *Attorney, Agent, or Firm* — Martin & Associates LLC; Bret J. Petersen

(57) ABSTRACT

A method and apparatus is described for dynamic relocation of a job executing on multiple nodes of a high performance computing (HPC) systems. The job is dynamically relocated when the messaging network is in a quiescent state. The messaging network is quiesced by signaling the job to suspend execution at a global collective operation of the job where the messaging of the job is known to be in a quiescent state. When all the nodes have reached the global collective operation and paused, the job is relocated and execution is resumed at the new location.

15 Claims, 6 Drawing Sheets

DYNAMIC JOB RELOCATION IN A HIGH PERFORMANCE COMPUTING SYSTEM

BACKGROUND OF THE INVENTION

1. Technical Field

This disclosure generally relates to high performance computing (HPC) systems, and more specifically relates to dynamic job relocation of a job executing on a plurality of nodes in an HPC system.

2. Background Art

High performance computing systems, sometimes referred to as supercomputers, continue to be developed to tackle sophisticated computing jobs. These computers are particularly useful to scientists for high performance computing (HPC) applications including life sciences, financial modeling, hydrodynamics, quantum chemistry, molecular dynamics, astronomy and space research and climate modeling. Supercomputer developers have focused on multi-node computers with massively parallel computer structures to solve this need for increasingly complex computing needs. The Blue Gene architecture is a massively parallel, multi-node computer system architecture developed by International Business Machines Corporation (IBM). References herein are directed to the Blue Gene/L system, which is a scalable system with 65,536 or more compute nodes. Each node consists of a single ASIC (application specific integrated circuit) and memory. Each node typically has 512 megabytes of local memory. The full computer is housed in 64 racks or cabinets with 32 node boards in each. Each node board has 32 processors and the associated memory for each processor. As used herein, a massively parallel computer system is a system with more than about 10,000 processor nodes.

Massively parallel computer systems like Blue Gene are expensive and thus their utilization or throughput needs to be maximized get the greatest possible amount of work through the system each hour. Typically there are jobs of varying size and runtime that need to be scheduled on the system. The job allocation needs to be properly managed to achieve the correct balance of throughput and response time. The response time to execute a particular job may suffer when maximizing the overall throughput such that some users don't get a responsive system. With many prior art methods for job allocation, the available system partitions or contiguous node blocks can become sparse and small system partition gaps between jobs can occur such that there is insufficient contiguous space to load a new job.

Techniques have been developed to defragment the blocks of resources so that more contiguous physical resources are available for a new job to begin execution. Jobs can sometimes be relocated to improve job allocation and free up contiguous space. However, the majority of applications or jobs that execute on a HPC system involve message passing between nodes, thus they cannot simply be suspended and relocated at any time without losing data in transit between the nodes.

This disclosure is directed to dynamically relocating a job executing on an HPC system, and in particular where the job includes message passing between nodes. Dynamic relocation can be used to defragment blocks of nodes to achieve better system optimization.

DISCLOSURE OF INVENTION

A relocation manager of an HPC system dynamically relocates a job with node messaging executing on multiple nodes of the system to defragment blocks of nodes to increase system utilization. The job is dynamically relocated when the messaging network is in a quiescent state. The messaging network is quiesced by signaling the job to suspend execution at a global collective operation of the job where the messaging of the job is known to be in a quiescent state. When all the nodes have reached the global collective operation and paused, the job is relocated and execution is resumed at the new location.

The disclosed embodiments are directed to the Blue Gene architecture but can be implemented on any HPC system having a global collective operation or global barrier operation that can be trapped to pause the job execution. The foregoing and other features and advantages will be apparent from the following more particular description, as illustrated in the accompanying drawings.

BRIEF DESCRIPTION OF DRAWINGS

The disclosure will hereinafter be described in conjunction with the appended drawings, where like designations denote like elements, and.

DETAILED DESCRIPTION

Figure 1:
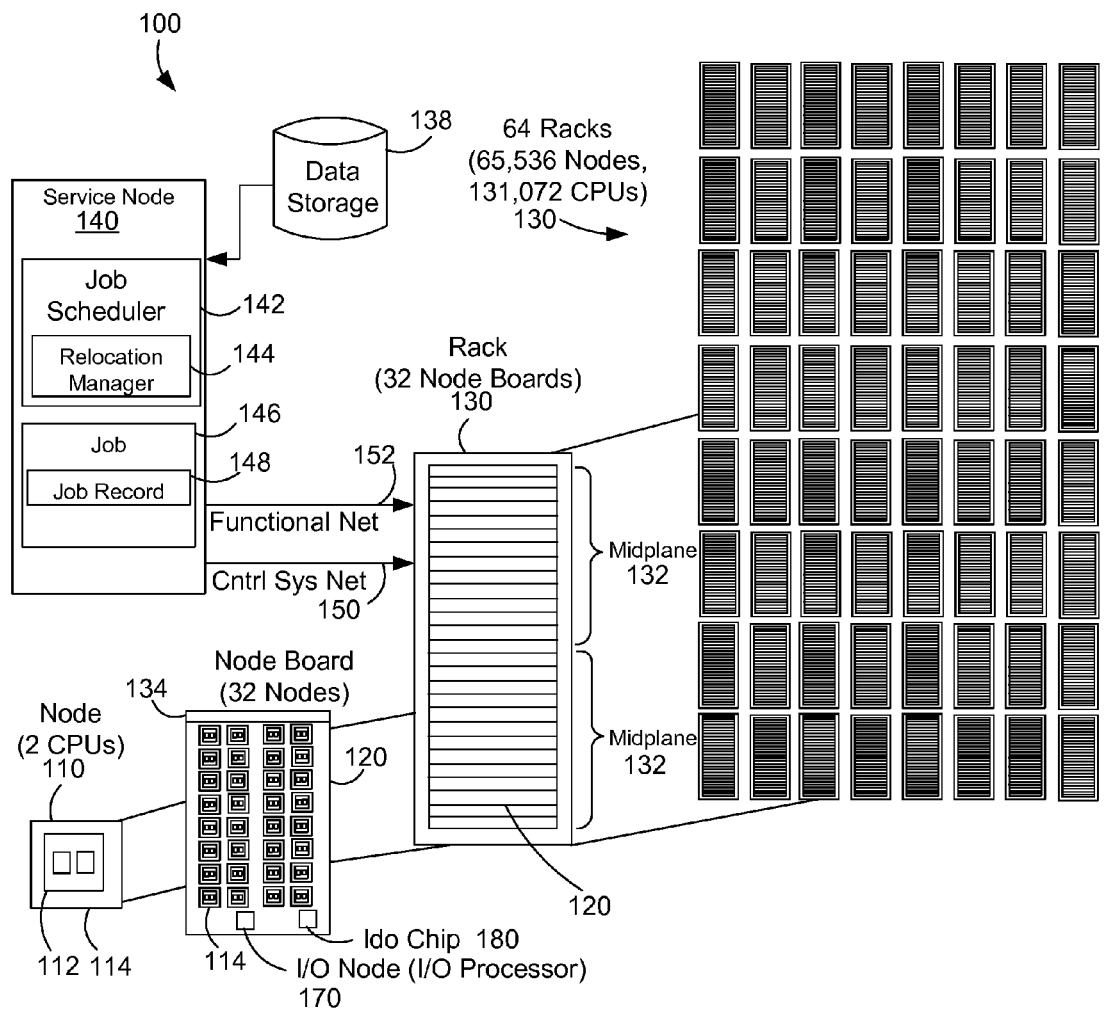
FIG. 1 is a block diagram of a computer system according to preferred embodiments.

A relocation manager of an HPC system dynamically relocates a job with node messaging executing on multiple nodes of the system to defragment blocks of nodes to increase system utilization. The job is dynamically relocated when the messaging network is in a quiescent state. The messaging network is quiesced by signaling the job to suspend execution at a global collective operation of the job where the messaging of the job is known to be in a quiescent state. When all the nodes have reached the global collective operation and paused, the job is relocated and execution is resumed at the new location.

Many HPC applications or jobs involve messaging between nodes or other significant continuous network traffic. Applications which involve messaging cannot simply be suspended and relocated at any time that the system needs to re-allocate the applications for better system utilization. The system must wait until the network quiesces such that there are no messages in route between nodes. Preferably the determination that the application messaging is in a quiescent state and ready for relocation can be done without modifying the application or job code since modification of the code is complex and expensive. As described herein, the job is forced into a quiescent state before the relocation using an existing global collective operation such that the application need not be modified to facilitate dynamic relocation. Preferably, the job is set up to pause at the next global collective operation by signaling the node to set a trap on a call to a global collective operation by the application software.

As used herein, a global collective operation is a messaging operation in which every node involved with the job participates. To complete the operation, every node must make a call to the collective function. Communication patterns can be one-to-many, many-to-one, or many-to-many. Message passing between compute nodes typically use global collective operations. Message Passing Interface (MPI) is a specification for an application programming interface (API) that allows many compute nodes to communicate with one another in a cluster or HPC system as described herein. MPI is a de facto standard for communication among processes of a parallel program running with a distributed memory system. Examples of collective operations include global barrier operations, broadcast operations, and reduce operations. A global barrier operation is a specific type of collective operation in which no single node can leave the barrier operation until the last node enters the barrier. This provides a synchronization point to ensure all nodes in the job are at the same point in the code at the same time. As a benefit for dynamic relocation, the synchronization point also insures that the network is in a quiescent state. In Blue Gene/L, global collective operations can be carried out on the tree network with the collective network adapter described below. Further, a global barrier operation can be carried out with the interrupt network and the global interrupt network adapter described below.

FIG. 1 shows a block diagram that represents a massively parallel computer system 100 such as the Blue Gene/L computer system. The Blue Gene/L system is a scalable system in which a full system has 65,536 or more compute nodes. Each compute node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene supercomputer's 65,536 computational nodes and 1024 I/O processors are arranged into both a logical tree network and a logical 3-dimensional torus network. Blue Gene can be described as a compute node core with an I/O node surface. Each I/O node handles the input and output function of 64 compute nodes. Communication to 1024 compute nodes 110 is handled by each I/O node 170 that has an I/O processor connected to the service node 140. The I/O nodes 170 have no local storage. The I/O nodes are connected to the compute nodes through the logical tree network. The I/O nodes also have functional wide area network capabilities through a gigabit Ethernet Functional network 152. The Functional network 152 is connected to an I/O processor (or Blue Gene/L link chip) in the I/O node 170 located on a node board 120 that handles communication from the service node 160 to a number of nodes. The Functional network 152 may also be connected to file servers (not shown) and other front end nodes (not shown). The Blue Gene/L system has one or more I/O nodes 170 connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below. In the Blue/Gene/L system there may also be a number of front end nodes that are similar to the service node 140. As used herein, the term service node includes these other front end nodes.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node 140 includes a job scheduler 142 that handles job scheduling, including the allocation of node resources. The job scheduler 142 includes a relocation manager that handles the dynamic relocation of jobs to free up contiguous blocks of nodes as described herein. The job scheduler 142 and the relocation manager 144 are preferably software entities that have the features described herein. The service node 140 further includes one or more jobs 146 that are ready to be scheduled for execution. The job(s) 146 include a job record 148 that has information about the job as described further with reference to FIG. 6. The job(s) 146 may also be stored in the data storage 138 or on a file server (not shown).

Figure 2:
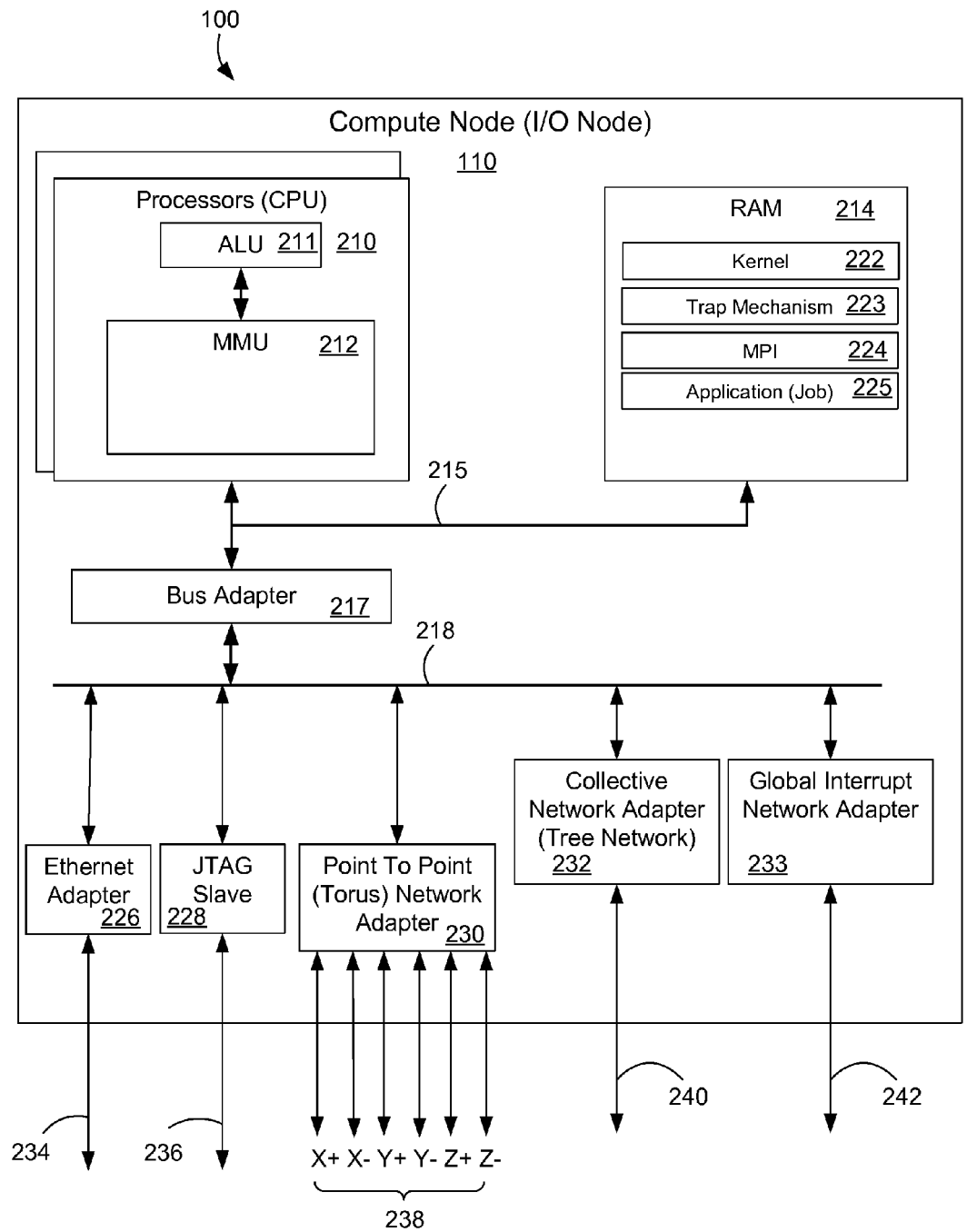
FIG. 2 is a block diagram of a single node of a massively parallel computer system according to preferred embodiments.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system with the functional network 152 on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is an operating system kernel 222, a trap mechanism 223 message passing interface (MPI) 224, and an application or job 225. The trap mechanism 223 is a routine to intercept the signal from the relocation manager (144 in FIG. 1) and set up a trap for the global collective operation. The MPI 224 is an API for message passing as described above. The MPI 224 is typically a linked library of the application and may be considered part of the application or it may be a separate software entity. The application 225 is a local copy of the job 146 shown in FIG. 1, and is loaded on the node by the control system to perform a user designated task. The application program or job 225 typically runs in parallel with application programs running on adjacent nodes of a block of nodes as described further below. The operating system kernel 222 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232, 233 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples an I/O node 110 for data communications to a Gigabit Ethernet 234 or also known as the Functional network 152 described in FIG. 1. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network. The data communications adapters further include a global interrupt network adapter 233 that connects the nodes to a global interrupt bus 242. The global interrupt bus 242 in the Blue Gene system is a four-bit bidirectional bus that connects all the compute node and I/O nodes in a branching fan out topology for global interrupts.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

Figure 3:
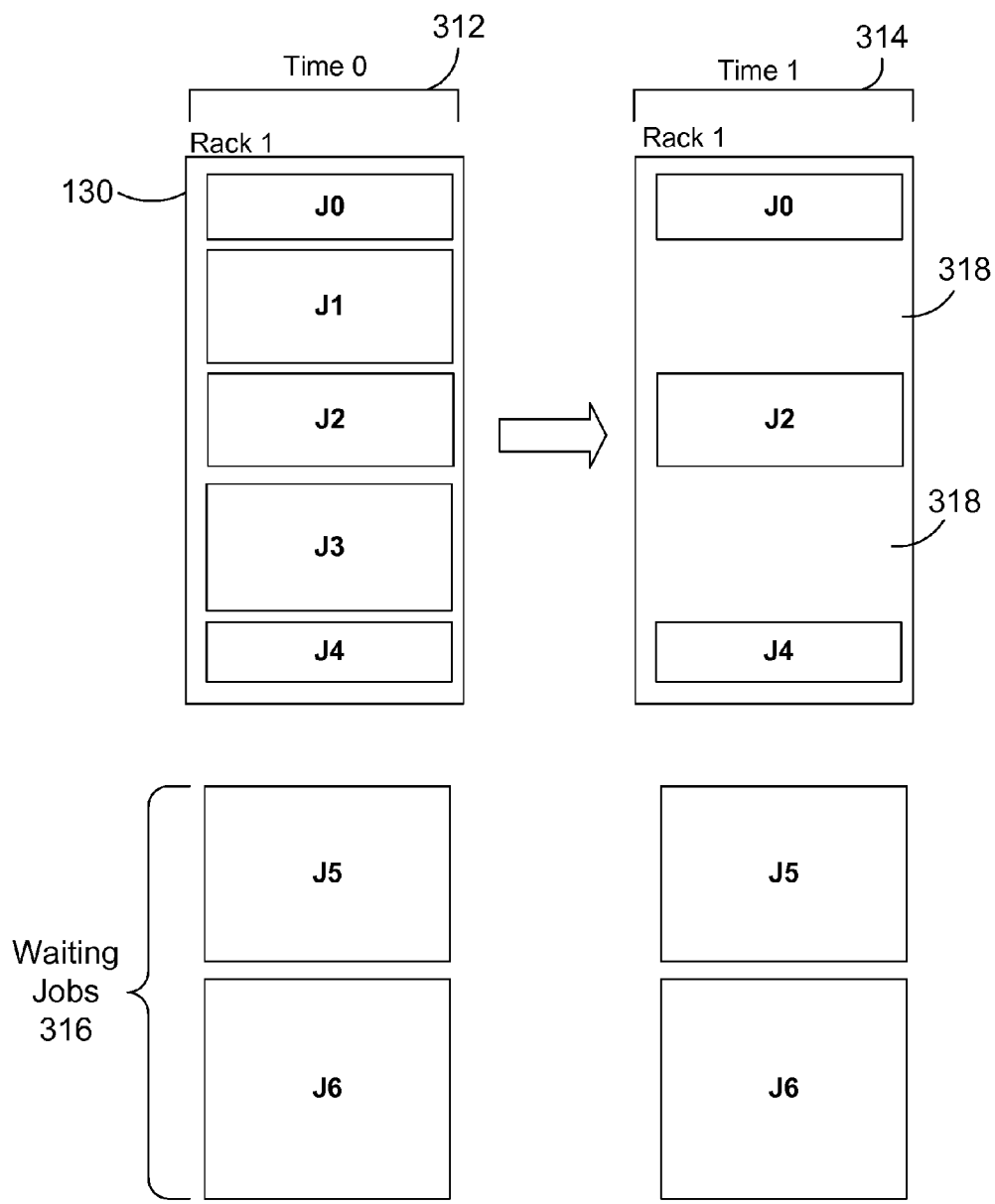
FIG. 3 illustrates allocation of a rack of nodes on HPC computer system that becomes fragmented as some jobs complete execution.
Figure 4:
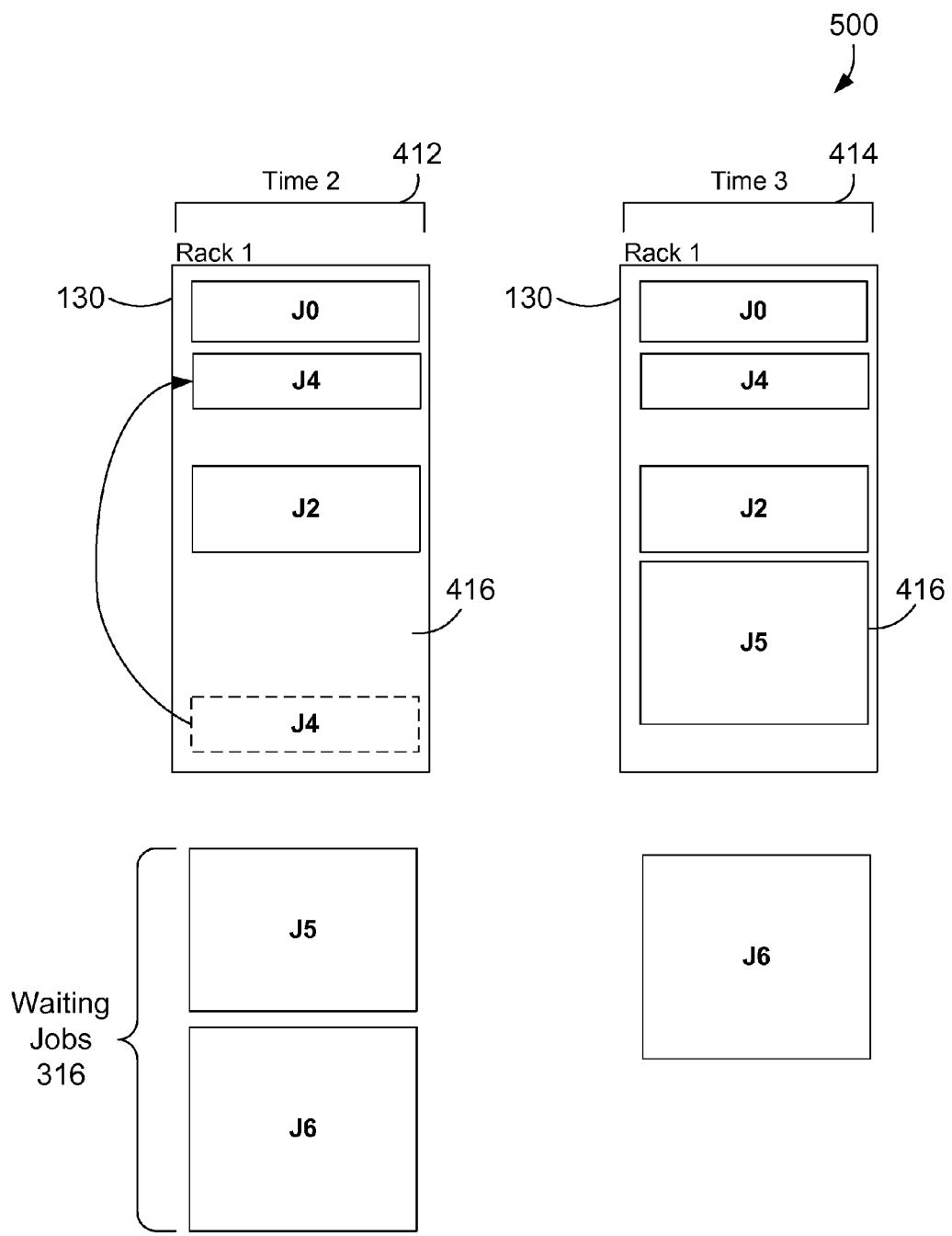
FIG. 4 illustrates a job reallocated in order to defragment the available nodes into a contiguous group that can be allocated to a larger new job.

FIGS. 3 and 4 illustrate an example of the job scheduler in conjunction with the relocation manager allocating jobs on an HPC computer system. FIGS. 3 and 4 represent the allocation nodes in a rack of compute nodes to various jobs. The Figures represent the allocation of jobs of an HPC computer system as described above at consecutive points in time. Referring now to FIG. 3, the block diagram has a rack 130 of compute nodes represented at two points in time, Time 0 312 and Time 1 314. The compute nodes in the rack 130 at Time 0 have been allocated to 5 different jobs identified as J0 through J4. There are waiting jobs 316 residing on the service node (140 in FIG. 1) waiting to be scheduled onto the compute nodes for execution. At Time 1, jobs J1 and J3 have completed, leaving fragmented groups of computed nodes 318 as shown. At this time, the job scheduler can not load and execute job J5 because there is not a contiguous group of compute nodes of sufficient size to accommodate the job. The job scheduler at this point will request the relocation manager (144 in FIG. 1) to determine whether to defragment the nodes in the rack 130 by relocating an executing job to make a group of nodes large enough to accommodate job J5.

FIG. 4 shows a similar block diagram as described with reference to FIG. 3. FIG. 4 illustrates the state of the rack 130 of compute nodes at Time 2. At Time 2, the relocation manager has determined to dynamically relocate job J4 into the space between jobs J0 and J2 according to the method described herein. Moving job J4 creates a defragmented space 416 that comprises a group of contiguous nodes of sufficient size to accommodate job J5, which is the next job waiting to execute. At Time 3 414, the job scheduler (142 in FIG. 1) has loaded job J5 into the newly defragmented space 416 for execution.

Before dynamically relocating a job to improve system utilization, the relocation manager determines whether there is a job that can be relocated and where to relocate the job. The relocation manager may determine whether a job is eligible for relocation by accessing the dynamic relocation control parameter as described below. To determine where to locate the job, the relocation manager can consider the size of jobs waiting to execute, how much contiguous space could be available if a job is dynamically relocated, how long jobs have been running, how long jobs will likely to run based on historical execution time (see 616 in FIG. 6) or user specified parameters, job priority etc. Based on these criteria, the relocation manager makes a decision to dynamically relocate an executing job.

When the relocation manager determines to dynamically relocate a job, preferably the job is allowed to enter a quiesced messaging state before the relocation using a global collective operation. The relocation manager preferably signals the nodes to pause at a global collective operation to ensure a quiesced messaging state. This can be done by sending a control signal to the trap mechanism (223 in FIG. 2) associated with the kernel software of the nodes to set up a trap. The trap mechanism sets up a trap to stop all the processors when the application accesses a global collective operation during the normal execution of the application code. The trap mechanism preferably uses software to set a trap to determine when the nodes have accessed a global collective operation and to notify the kernel. For example, in response to the signal to pause the processor at the next global collective operation, the trap mechanism could be activated in each node to intercept API calls to the MPI. When the application software makes a request to the MPI, the trap mechanism recognizes the access to the MPI. The trap mechanism then pauses the job and signals the relocation manager that the application on this node is waiting for a signal from the relocation manager to resume operation. To implement the trap mechanism in this way, the MPI library could be modified to signal the kernel each time a global collective operation is called. Alternatively, the trap mechanism could be implemented by an interrupt routine in the kernel, etc. An example of the relocation manager dynamically relocating a job in this manner is described further with reference to FIG. 7.

The previous paragraph describes a software method of implementing the functions of the trap mechanism. Alternatively, portions of the trap mechanism could be implemented with hardware. For example, the trap mechanism could incorporate special hardware to determine when the nodes have accessed a global collective operation and to notify the kernel. For example, hardware could monitor the collective network adapter 232 and/or the global interrupt adapter 233 to determine the job has accessed a global collective operation and then use a hardware interrupt to notify the kernel that the message network is in a quiesced state at the start or end of a global collective operation.

Figure 5:
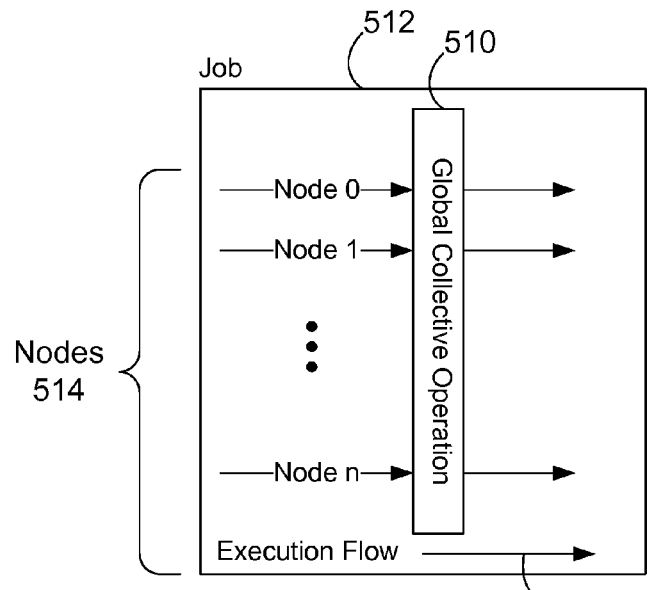
FIG. 5 illustrates a job executing on multiple nodes is suspended at a global collective operation.

FIG. 5 shows a block diagram that illustrates how a global collective operation 510 is used to provide a synchronization point for an application or job 512 executing on a group of compute nodes. The global collective operation 510 may be a barrier operation that naturally provides node synchronization, or another global collective operation that is used to provide a synchronization point for the application by pausing the job on the nodes until all the nodes have paused at the global collective operation as described herein. FIG. 5 represents a single job 512. The job 512 is executing on a group of nodes 514 allocated on a rack of nodes as described above. In this example, the job 512 is executing on Node 0 through Node n. Execution flow is represented by the arrow 516 from left to right. The global collective operation 510 can be used to synchronize the job 512 across the nodes 514 by pausing each compute node's execution of the job when each node enters or exits the global collective operation. The job then continues execution with all the nodes have encountered or processed the global collective operation 510.

Figure 6:
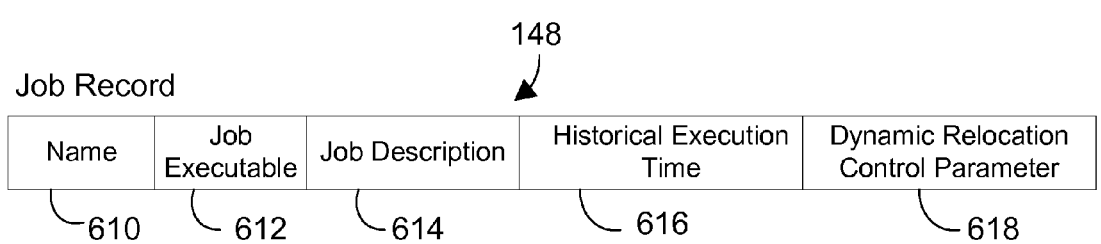
FIG. 6 illustrates a block diagram of a job record.

FIG. 6 shows a block diagram of the data structure for a job record 148 as introduced with reference to FIG. 1. The job record 148 includes data elements of job name 610, job executable 612, job description 614, historical I/O utilization 616, and dynamic relocation control parameter 618. The job record may be stored on the service node 140 (FIG. 1) or on a data server (not shown) connected to the service node. The dynamic relocation control parameter can be set by the application or a user to control whether dynamic relocation of the application is allowed. Where this control parameter is implemented, the relocation manager accesses the dynamic relocation control parameter 618 to determine if dynamic relocation is currently allowed for this application before performing the relocation.

Figure 7:
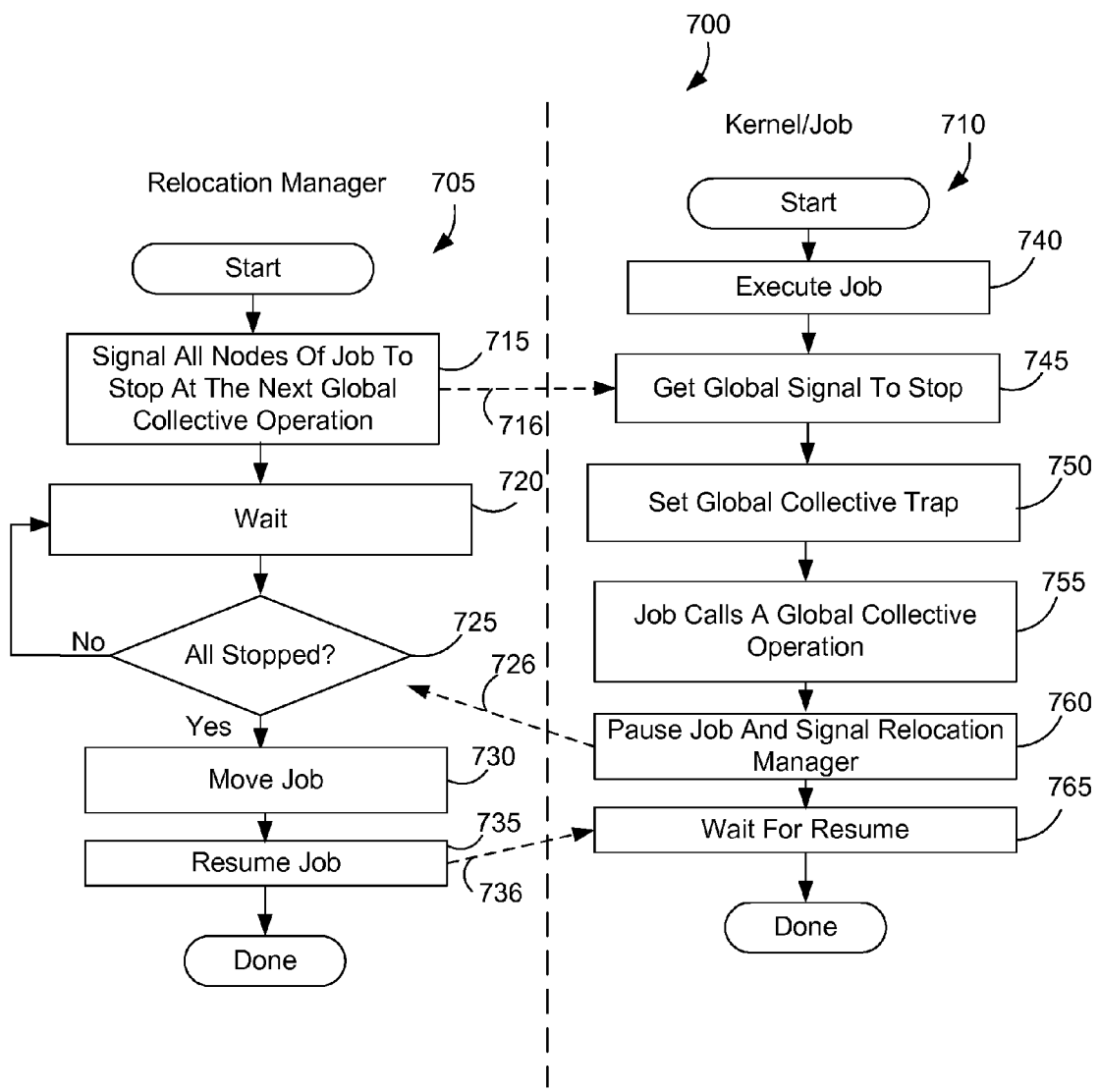
FIG. 7 is a method flow diagram for relocating a job on high performance computer system using a global collective operation to quiesce the application messaging.

FIG. 7 shows an exemplary method 700 of dynamically relocating a job on a HPC system. The steps of method 700 include steps 705 that are preferably performed by the relocation manager, and steps 710 that are preferably performed on the compute nodes by software in the kernel or by the application or job. The interaction between the two portions of the method is described below. The interaction is indicated by the dotted arrows between the two portions of the method. As a preliminary to the method 700, it is assumed that the job scheduler or the relocation manager has determined that relocating a job is needed to make a contiguous space sufficient for a waiting job, and that the job to be relocated is available for relocation as indicated by the dynamic relocation control parameter in the corresponding job record.

Again referring to FIG. 7, the method 705 executes as follows. The relocation manager determines to dynamically relocate a job and starts execution. The relocation manager sends a signal 716 to all the compute nodes executing the job to stop at the next global operation (step 715). The signal 716 is preferably a network signal sent to each node executing the job. The relocation manager then waits (step 720) until all the nodes have stopped (step 725). Each of the nodes sends a signal 726 when the node has stopped as described below. If the nodes have not all stopped (step 725=no) then it continues to wait (step 720). If the nodes have all stopped (step 725=yes) then the job is moved (step 730) to a new block of nodes. The job can then be resumed (step 735) by sending a restart signal 736 to all the compute nodes to continue execution of the job from the point it was suspended at the global collective operation. The method is then done.

Again referring to FIG. 7, the method 710 executes as follows. The compute node begins execution of an application or job (step 740). During execution of the job, the node (kernel software) receives a signal from the relocation manager to stop the application for dynamic relocation (step 745). The node sets a global collective trap (step 750) to pause execution at the next global collective operation. When the job calls a global collective operation set for the trap (step 755), the kernel software will pause the job and signal the relocation manager that the job on this compute node is paused (step 760). The job then waits for a resume signal from the relocation manager (step 765). The method is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As described above, embodiments provide a method and apparatus for dynamic job relocation for a massively parallel computer system. One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A computer implemented method for dynamically relocating a job executing on a plurality of compute nodes in a high performance computing (HPC) system comprising:
   a relocation manager performs the steps of:
   1a) determining to dynamically relocate the job executing on the plurality of compute nodes of the HPC system, where determining to dynamically relocate the job includes accessing a dynamic relocation control parameter in a job record associated with the job to determine if dynamic relocation is currently allowed for the job;
   2a) signaling the plurality of compute nodes to pause execution at the next global collective operation using a message passing interface (MPI) to ensure a quiesced messaging state;
   3a) waiting until the plurality of compute nodes of the job have signaled they have paused in response to a global collective operation;
   4a) moving the job to a new location on the multi-node computer system; and
   5a) resuming the job at the new location;
   wherein each compute node performs the steps of:
   1b) receiving the signal to pause execution;

2b) setting a global collective trap in response to the signal to pause execution by a relocation trap mechanism associated with an operating system kernel at the next global collective operation;
3b) the job calling the global collective operation to the message passing interface;
4b) stopping the job and signaling the relocation manager in response to the global collective operation; and
wherein the job includes a job record stored on a service node having data elements of job name, job executable, job description, historical I/O utilization, and the dynamic relocation control parameter; and the relocation trap mechanism is a routine to intercept the signal from the relocation manager and incorporates hardware to determine when the plurality of compute nodes have accessed the global collective operation and to notify the operating system kernel.

2. The computer implemented method of claim 1 wherein in the job calling the global collective operation is a call by the job to the message passing interface.

3. The computer implemented method of claim 1 wherein the relocation manager executes on the service node connected to the HPC system.

4. The computer implemented method of claim 1 wherein the plurality of compute nodes comprise the relocation trap mechanism associated with the operating system kernel that receives the signal to pause execution and sets the global collective trap.

5. The computer implemented method of claim 4 wherein the trap mechanism comprises hardware to set the global collective trap by monitoring network hardware and using hardware to notify the operating system kernel that the node has encountered the global collective operation.

6. An article of manufacture comprising:
A) a relocation manager for an high performance computing (HPC) system and when executed by the HPC system performs the steps of:
1a) determining to dynamically relocate a job executing on a plurality of compute nodes of the HPC system, where determining to dynamically relocate the job includes accessing a dynamic relocation control parameter in a job record associated with the job to determine if dynamic relocation is currently allowed for the job;
2a) signaling the plurality of compute nodes to pause execution at the next global collective operation using a message passing interface (MPI) to ensure a quiesced messaging state;
3a) waiting until the plurality of compute nodes of the job have signaled they have paused in response to the global collective operation;
4a) moving the job to a new location on the multi-node computer system; and
5a) resuming the job at the new location; and
B) non-transitory computer recordable media bearing the relocation manager;
wherein each compute node performs the steps of:
1b) receiving the signal to pause execution;
2b) setting a global collective trap in response to the signal to pause execution by a relocation trap mechanism associated with an operating system kernel at the next global collective operation;
3b) the job calling the global collective operation to the message passing interface;
4b) stopping the job and signaling the relocation manager in response to the global collective operation; and
wherein the job includes a job record stored on a service node having data elements of job name, job executable, job description, historical I/O utilization, and the dynamic relocation control parameter; and the relocation trap mechanism is a routine to intercept the signal from the relocation manager and incorporates hardware to determine when the plurality of compute nodes have accessed the global collective operation and to notify the operating system kernel.

7. The article of manufacture of claim 6 wherein the job software calling
a global collective operation is a call by the job to the message passing interface (MPI).

8. The article of manufacture of claim 6 wherein the plurality of compute nodes comprise the relocation trap mechanism associated with the operating system kernel that receives the signal to pause execution and sets the global collective trap.

9. The article of manufacture claim 8 wherein the trap mechanism comprises hardware to set the global collective trap by monitoring network hardware and using hardware to notify the operating system kernel that the node has encountered the global collective operation.

10. A high performance computing (HPC) system comprising:
A) a plurality of compute nodes connected by one or more networks;
B) a service node connected to the plurality of compute nodes;
C) a relocation manager that performs the steps of:
1a) determining to dynamically relocate a job executing on the plurality of compute nodes of the HPC system, where determining to dynamically relocate the job includes accessing a dynamic relocation control parameter in a job record associated with the job to determine if dynamic relocation is currently allowed for the job;
2a) signaling the plurality of compute nodes to pause execution at the next global collective operation using a message passing interface (MPI) to ensure a quiesced messaging state;
3a) waiting until the plurality of compute nodes of the job have signaled they have paused in response to a global collective operation;
4a) moving the job to a new location on the multi-node computer system; and
5a) resuming the job at the new location,
wherein each compute node performs the steps of:
1b) receiving the signal to pause execution;
2b) setting a global collective trap in response to the signal to pause execution by a relocation trap mechanism associated with an operating system kernel at the next global collective operation;
3b) the job calling the global collective operation to the message passing interface;
4b) stopping the job and signaling the relocation manager in response to the global collective operation; and
wherein the job includes a job record stored on a service node having data elements of job name, job executable, job description, historical I/O utilization, and the dynamic relocation control parameter; and the relocation trap mechanism is a routine to intercept the signal from the relocation manager and incorporates hardware to determine when the plurality of compute nodes have accessed the global collective operation and to notify the operating system kernel.

11. The HPC system of claim 10 wherein the global collective operation is chosen from the following: a global barrier operation, a broadcast operation, and a reduce operation.

12. The HPC system of claim 10 wherein in the job software calling the global collective operation is a call by the job to the message passing interface.

13. The HPC system of claim 10 wherein the relocation manager executes on the service node connected to the HPC system.

14. The HPC system of claim 10 wherein the plurality of compute nodes comprise the relocation trap mechanism associated with the operating system kernel that receives the signal to pause execution and sets the global collective trap.

15. A computer implemented method for dynamically relocating a job executing on a plurality of compute nodes in a high performance computing (HPC) system comprising:
　a) a relocation manager that performs the steps of:
　1a) determining to dynamically relocate the job executing on the plurality of compute nodes of the HPC system, where determining to dynamically relocate the job includes accessing a dynamic relocation control parameter in a job record associated with the job to determine if dynamic relocation is currently allowed for the job;
　2a) signaling the plurality of compute nodes to pause execution at the next global collective operation using a message passing interface (MPI) to ensure a quiesced messaging state;
　3a) waiting until the plurality of compute nodes of the job have signaled they have paused in response to a global collective operation;
　4a) moving the job to a new location on the multi-node computer system; and
　5a) resuming the job at the new location;
　b) at each compute node performing the steps of:
　1b) receiving the signal to pause execution;
　2b) setting a global collective trap in response to the signal to pause execution by a relocation trap mechanism associated with an operating system kernel at the next global collective operation;
　3b) the job calling the global collective operation to the message passing interface;
　4b) stopping the job and signaling the relocation manager in response to the global collective operation; and
　　wherein the job includes a job record stored on a service node having data elements of job name, job executable, job description, historical I/O utilization, and the dynamic relocation control parameter; and the relocation trap mechanism is a routine to intercept the signal from the relocation manager and incorporates hardware to determine when the plurality of compute nodes have accessed the global collective operation and to notify the operating system kernel.

* * * * *